Jan. 4, 1927.
G. W. DETTNER
1,613,087
RULE MITER AND CUT-OFF
Filed Feb. 16, 1925    2 Sheets-Sheet 2
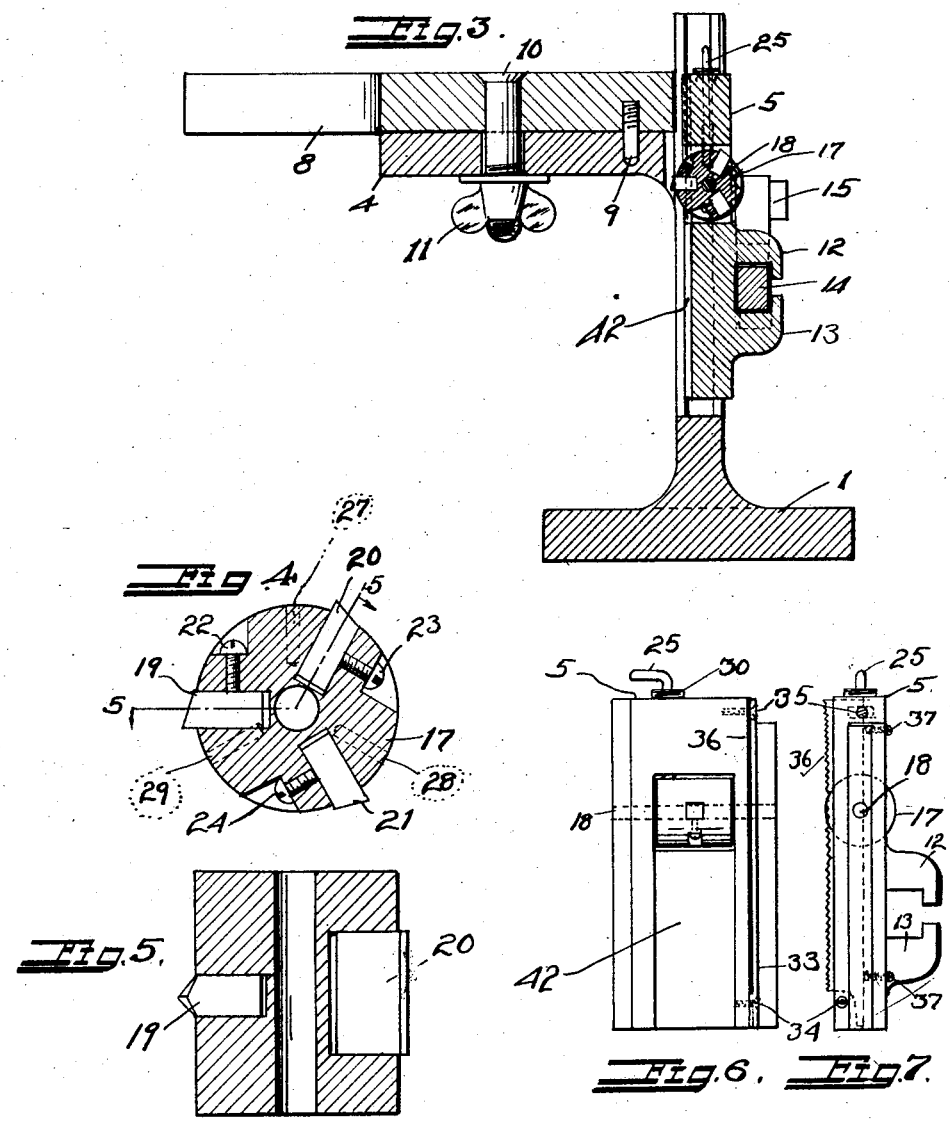
INVENTOR.
George W. Dettner
BY
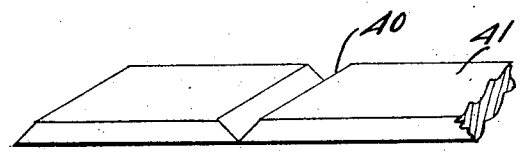
ATTORNEY.

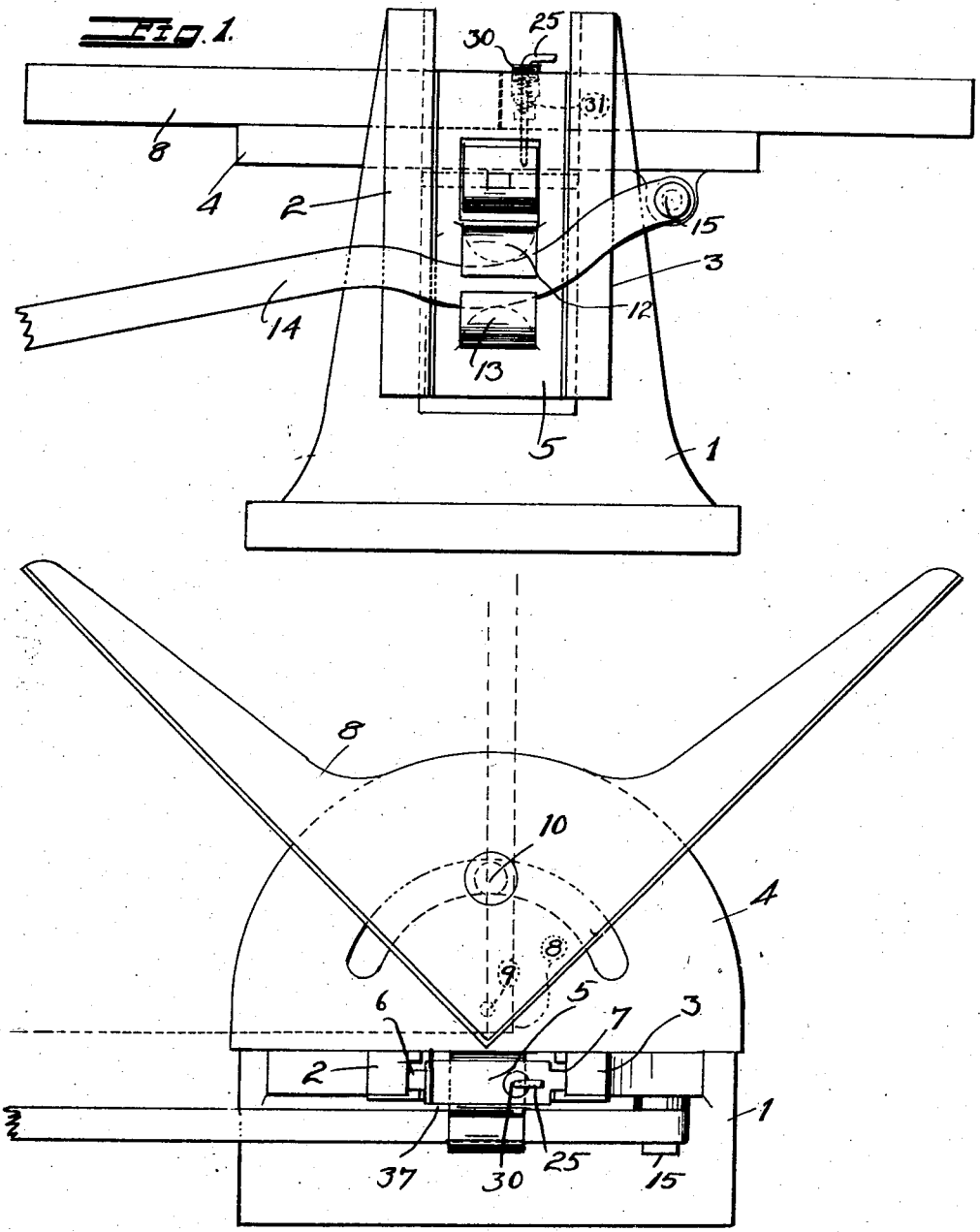

Patented Jan. 4, 1927.

1,613,087

UNITED STATES PATENT OFFICE.

GEORGE W. DETTNER, OF SAN FRANCISCO, CALIFORNIA.

RULE MITER AND CUT-OFF.

Application filed February 16, 1925. Serial No. 9,373.

This invention relates to a rule miter and cut-off, and its object is to produce a machine which is capable of cutting off rules as well as mitering them both at the ends and between the ends of the rule.

It will be understood by those skilled in the art that printing rules must be mitered not only at the ends, but frequently between the ends, and in addition, means must be provided for cutting them off smoothly, which latter, in this machine, is done with a saw which does not distort the rule as is frequently the case where the rule is cut off in a shearing machine.

Other objects of the invention will appear as the description proceeds.

An embodiment of the invention is shown in the accompanying drawings, in which the same reference numeral is applied to the same portion throughout, but I am aware that there may be modifications thereof.

Fig. 1 is a front elevation of the complete machine.

Fig. 2 is a plan view of the complete machine.

Fig. 3 is a sectional view of the complete machine.

Fig. 4 is a transverse sectional view of the cutter-holding cylinder or roller.

Fig. 5 is a longitudinal view of the sectional cutter-holding cylinder or roller.

Fig. 6 is a front elevation of the cutter head.

Fig. 7 is a side elevation of the cutter head.

Fig. 8 is a perspective view of a portion of a rule showing an end miter and a miter intermediate the ends of the rule.

The machine comprises a base 1, projecting upwardly from which are two standards, 2 and 3, which support a horizontal shelf 4; at their inner edges the two standards are grooved to receive the miter head 5, and the grooves in said standard are wide enough to allow a considerable lateral movement of said head at 6 and 7, Fig. 2. The object of said lateral movement being to allow the rule to be cut off, or to allow a miter to be produced intermediate the ends of the rule.

Mounted upon the table 4, is a square 8. This square is pivoted at 9, and has a bolt 10, with a wing nut 11, to secure it in any desired adjustment.

The head 5 is provided with two reversely flanged rearwardly projecting lugs 12 and 13. Said lugs forming the means for connecting the slidable head to the operating handle 14, said handle being pivotally mounted on a pin 15 secured to the underside of the table 4. The slide 5 has a transverse recess to receive a small roller 17. This roller is journalled upon a steel pin 18, and it is recessed to receive three cutters 19, 20 and 21, said cutters having any desired face angle, and being held in place in the roll by means of the set screws 22, 23 and 24. The roller is held in a fixed position to effect the cutting by means of a pin 25, which passes through the upper portion of the head 5, and into any one of three holes 27, 28 or 29 in said roller 17.

The pin 25 passes through a bushing 30 and has a spring 31 surrounding it to hold it normally in the position shown in Fig. 1. The bushing is threaded into the slide 5 to secure it and the pin with its surrounding spring in place.

At the side of the slide 5, there is a rule, or flat bar, 33, which is held in place by the counter-sunk screws 34 and 35, and said plate in turn holds a saw 36 in place.

The saw is adjusted to take a deeper or shallower cut by setting up a screw 37 at the back of the slide 5, so that by turning the rule to be cut over, it is possible to saw off a rule double the thickness of the space allowed at the points 6 and 7.

When a rule is to be beveled on one end or the other it is unnecessary to remove the saw from the head 5, but if a bevel such as is shown at 40 on the rule 41 (see Fig. 8) is to be made, the saw is removed from the slide, and the square 8 is turned so as to allow the desired space between the standards 2 and 3 for the passage of the rule, whereupon, one of the miters, such as 19, is used to cut the desired recess in the rule (see dotted lines Fig. 2).

It will be seen that while the head 5 has some forward and back movement, that it is so closely engaged at its sides with the two standards 2 and 3, that it does not have any side movement, thereby insuring perfectly straight cuts being produced, while the depth of the cut is regulated by the workman himself.

It is also to be noticed that the arrangement of the table and slide is such that any chips shaved off by the cutters will drop down between the table and slide, so as not to interfere with the cutting operations. Said slide being recessed at 42 for this purpose.

The operation of the machine is as follows:

Presuming the workman desires to bevel the end of the rule, he will use the cutter of the form shown at 20, and will determine the angle of the cut by shifting the square 8 to the position he deems necessary; the handle 14 will then be raised and lowered to shave off the desired metal from the end of the rule, if the rule is to be cut off, or is to be beveled between its ends, the square 8 will be turned until one of its edges is substantially parallel to the straight edge of table 4, this will allow a space of about one-quarter inch (¼") between the standards 2 and 3, and the adjacent edge of the square 8; thereupon, the rule may be inserted and the head 5 is raised and lowered to either cut off the end of the rule or to operate one of the cutters 19 or 21 to produce a desired bevel cut intermediate the ends of the rule. If necessary, during this operation, the saw may be removed.

What I claim is as follows, but modifications may be made in carrying out the invention shown in the drawings, and in the above particularly described form thereof, within the purview of the invention, as defined by the annexed claims.

1. A machine of the class described, comprising a base having a pair of spaced vertical standards, grooves in said standards adapted to receive a sliding head, said slots being wide enough to allow some backward and forward movement of said slide, said head being adapted to have a sliding fit in the bottoms of said grooves without the side movement thereof; a roller in said slide, cutters in said roller, means to set said roller to bring each cutter into working position as required, a vertical saw in said head, a horizontal shelf on said standards, an adjustable mitering square pivoted on said shelf, and a lever for reciprocating said head.

2. A machine of the class described comprising a base having a pair of vertical standards, grooves in said standards adapted to receive a sliding head, a roller in said slide, a plurality of cutters in said roller, a pin in said slide adapted to engage a hole adjacent each of said cutters whereby each of said cutters may be set in working position as required, a horizontal shelf on said standards, an adjustable mitering square pivoted on said shelf and a lever for reciprocating said slide.

In testimony whereof I have hereunto set my hand this 9th day of February A. D. 1925.

GEORGE W. DETTNER.